United States Patent [19]

Berchtold et al.

[11] Patent Number: 5,303,549
[45] Date of Patent: Apr. 19, 1994

[54] COUNTERFORCE AND HOLDING DEVICE

[75] Inventors: Merrill E. Berchtold, Loveland; Dean M. Valvano, Cincinnati, both of Ohio

[73] Assignee: Cincinnati Milacron Inc., Cincinnati, Ohio

[21] Appl. No.: 740,280

[22] Filed: Aug. 5, 1991

[51] Int. Cl.$^5$ ............................................. F16B 31/02
[52] U.S. Cl. ........................................ 60/414; 91/433; 91/445; 91/469
[58] Field of Search ................ 60/404, 406, 414, 460, 60/477; 91/433, 445, 451, 469

[56] References Cited

U.S. PATENT DOCUMENTS

| | | | |
|---|---|---|---|
| 2,109,297 | 8/1938 | McMurry et al. | 60/460 |
| 3,062,601 | 11/1962 | Sadler et al. | 92/240 |
| 3,097,666 | 7/1963 | Antrim et al. | 251/357 |
| 3,807,175 | 4/1974 | Kubik | 60/460 |
| 4,221,156 | 9/1980 | Zirps | 91/447 |
| 4,622,803 | 11/1986 | Lech | 91/390 |
| 4,807,518 | 2/1989 | Berchtold et al. | 91/361 |

OTHER PUBLICATIONS

Kepner Products Co. spec. sheet for Single Lock Valves.
Parker Cylinder Division spec. sheet for hydraulic cylinders.
Poppenger et al, Industrial Hydraulics, copyright 1979, pp. 177-178, 397.
Textbook: *Fluid Power:* Theory and Applications Second Edition, James A. Sullivan, author, Reston Publishing Company, Inc., copyright 1982.
Magazine: *Hydraulics & Pneumatics* (1975) entitled "Can an Accumulator Help You Save Hydraulic Energy?", by Z. Zahid.
Cincinnati Milacron T-Bar CNC Machining Centers, Publication No. SP-166, copyright 1989, brochure of Cincinnati Milacron Marketing Company.

*Primary Examiner*—Edward K. Look
*Assistant Examiner*—F. Daniel Lopez
*Attorney, Agent, or Firm*—Thomas M. Farrell

[57] ABSTRACT

A counterforce cylinder and piston exert an upward force on the vertically movable slide of a machine. The cylinder pressure line handles reverse flows during operations of the slide. A pilot-operated checkvalve (normally closed) is inserted in the cylinder line between a pressure source and the counterforce cylinder, and is held open during usual operation of the machine. An accumulator is branch-connected to the cylinder line, at a point between the checkvalve and counterforce cylinder. During machine operations, the accumulator stores pressurized fluid; at shutdown of power, the fast-acting checkvalve closes and reliably seals the cylinder line while the accumulator provides pressure to maintain the counterforce cylinder and slide in a substantially constant holding position for several days.

4 Claims, 2 Drawing Sheets

COUNTERFORCE AND HOLDING DEVICE

TECHNICAL FIELD

This invention generally relates to machines having vertical slide motion. More particularly, the invention concerns itself with machines having heavy vertically-movable slides which require:

(a) a counterforce adaptable to slide positions during operation; and (b) a means for fixing slide position during periods of electrical power shutdown. Such a device must be fast acting, and capable of holding the slide position for long periods of time.

BACKGROUND OF THE INVENTION

In a typical horizontal machining center, a large, heavy slide is vertically-movable on a machine base, and the slide carries a cutting tool. A horizontal boring machine has similar elements, and also has a tool quill which may be extended in cantilever fashion from the slide. A versatile horizontal machining center, the T-BAR Model of Cincinnati Milacron Inc. includes an extendable tool quill. The quill carries a central spindle which may be selectively locked or rotated, and the spindle grasps a tool at its outboard end. The tool is used, for example, to bore deep holes or to do in-line boring throughout the walls of a casting. In some instances, the radial sweep of a rotating tool is preset, and the workpiece remains stationary. In still other applications, where large-diameter holes must be bored, the boring tool may remain stationary at a fixed radial distance from the hole centerline, and the workpiece may be rotated to effect the relative cutting speed. A typical slide drive combines a hydraulic or electric motor with a rotatable ballscrew, threadably engaged with a non-rotating preloaded ball nut on the slide. This type of machine frequently includes a counterforce cylinder, which is applied to the slide to assist the screw in overcoming friction and slide weight. When the electrical power to the machine is stopped, hydraulic systems are shutdown, and typically, conventional lines to the counterforce cylinder will leak fluid back to a fluid tank. Brakes are also frequently employed, to hold the screw from rotating during the cutting operation, and to resist "overhauling", i.e., backdriving rotation of the ballscrew due to slide weight.

It is known in fluid systems to connect an accumulator in a supply line to provide for necessary fluid force during periods when a fluid pump is at idle or stopped, during machine operations. However, the known applications of accumulators for relatively short periods of machine operation, (e.g., in the nature of an hour or less), do not provide for a long-term shutdown where a slide position must be held for approximately 48 hours.

It is highly desirable that a horizontal machine be capable of maintaining the cutting tool position relative the workpiece within a substantially accurate tolerance [e.g., 0.0007 inch (0.018mm)]. When such an accurate position is held, economical production occurs for the reasons that costly reset-up time is avoided, and, the chance of cutting errors on a partially finished, expensive workpiece is substantially reduced.

SUMMARY OF THE INVENTION

The invention is shown embodied in a machine having a vertically-movable slide mounted to a machine base, and having an improved counterforce and holding device, comprising: a fluid cylinder having a cooperating fluid powered piston guided therein, where either the cylinder or piston is attached to the slide and the other is attached to the base; a cylinder line connected to both the cylinder and a source of predetermined fluid pressure, so that an upward force is exerted on the slide; a fast-acting powered checkvalve located in the cylinder line between the cylinder and the pressure source, and the checkvalve is operable between a first position blocking the flow of fluid in a direction from the cylinder to the source, and a second position permitting the free flow of fluid in reverse directions within the fluid line; and a fluid accumulator, branch-connected to the cylinder line at a point between the cylinder and the checkvalve.

DESCRIPTION OF THE PREFERRED EMBODIMENT

Figure 1:
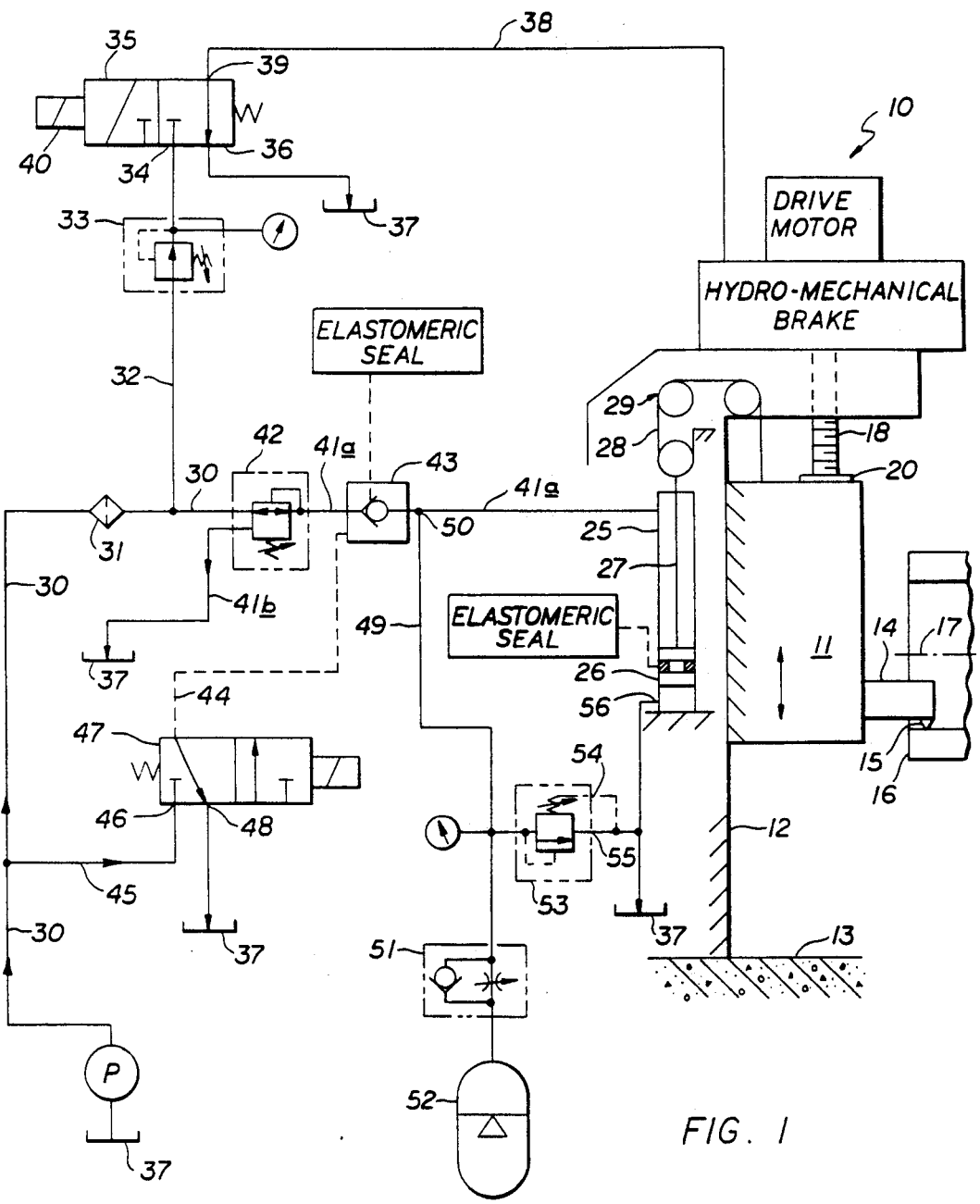
FIG. 1 is a schematic side elevational view of a machine having a vertically-movable slide, combined with a hydraulic diagram.

The drawing figure depicts a machine 10 having a slide 11 which is vertically movable on a base 12. For purposes of illustration, the machine 10 is a horizontal machine arranged for boring, where the base 12 constitutes a column mounted to the floor 13, or to any other convenient location. The machine slide 11 has a cantilevered tool support 14 with a cutting tool 15 affixed at the outboard end thereof. The cutting tool 15 is shown engaging an exemplary part 16, which is fixtured on means (not shown) for rotation about its central axis 17. Rotation of the part 16 relative to the cutting tool 15 provides the necessary cut speed for machining. Conversely, the tool 15 may comprise a radially-extending cutter which is rotated in its tool support 14, against a relatively stationary workpiece, in order to machine a bore. An axial feed motion is applied to the tool support 15.

The slide 11 is propelled on the base by a vertical ballscrew 18, which is mounted to the top of the column 12 and rotated by a drive motor 19. The motor 19 and screw 18 are constrained from axial movement, and the screw 18 is received in a mating ball nut 20 affixed to the slide 11. The drive motor 19 is mounted to a hydromechanical brake 21, for arresting screw rotation; the brake 21 is mechanically-applied and hydraulically-released.

The machine base 12 contains a counterforce cylinder 25 having a cooperating piston 26 guided therein, the cylinder 25 being attached to the base 12 and the piston rod 27 being attached to the slide by a flexible connector, in this case a chain 28, trained around a compound pulley system 29. The attachments of the cylinder 25 and piston rod 27 may be reversed. The chain 28 is connected to the slide 11 and fluid is applied to the piston 26 to exert an upward force on the slide 11, to counteract the effects of gravity.

The counterbalance cylinder 25 is used to relieve substantially all of the downward force caused by the slide weight, thus saving energy and permitting an economic selection of ballscrew 18 and motor 19.

With the system under full electric power, and all hydraulic components operational, the motor 19 and screw 18 will position the slide 11 to a desired location and boring operations may commence, while the brake 21 remains released. While the brake 21 is sufficient to prevent an uncontrolled descent of the slide 11 when electrical power is disconnected, it will not prevent an undesirable loss of slide position. It is therefore desirable that the counterforce cylinder 25 be quickly locked at the time electrical power is disconnected, and that the counterforce cylinder 25 be capable of maintaining the slide position for a relatively long period of time, typically, one to two days.

A main supply line 30, communicating with a reservoir tank 37, carries pressurized hydraulic fluid from the supply pump "P", which is routed through an inline filter 31. After the filter 31, the line 30 is tapped for a branch pressure line 32 used to release the brake 21. The branch line 32 is run through a pressure reducing valve 33 and connected to the supply port 34 of a solenoid-operated, spring-return three-way valve 35; the exhaust port 36 of the valve 35 is returned to the reservoir tank 37. The brake line 38 is connected to the cylinder port 39 of the valve 35, so that the brake line 38 normally runs straight through to the tank 37. When the solenoid 40 is energized, the branch pressure line 32 is connected to the brake line 38 to release the brake 21.

The counterforce cylinder line 41a is connected to the main line 30 through a pressure reducing and relief valve 42, which is capable of maintaining a maximum pressure within the counterforce cylinder line 41a, and which permits the line 41a to be unloaded to the tank 37, through an exhaust line 41b, as reverse flows occur with slide motion. The reducing and relief valve 42 is considered the source of pressure to operate the counterforce cylinder 25. A pilot-operated checkvalve 43 is inserted into the counterforce cylinder line 41a, between the counterforce cylinder 25 and the pressure reducing and relief valve 42. The checkvalve 43 is normally-closed, blocking one-way flow from the counterforce cylinder 25 to the pressure reducing and relief valve 42; the checkvalve 43 is powered to an open position by a pilot line 44, permitting two-way flow through the checkvalve 43 and counterforce cylinder line 41a. For checkvalve 43 operation, a branch pilot pressure line 45 is tapped from the main supply line 30 and connected to the pressure port 46 of a solenoid-operated, spring-return three-way valve 47. The exhaust port 48 connects to the tank 47. When the machine 10 is running, i.e., when electrical power is available, the valve 47 is shifted so that pressure is directed to the pilot line 44 to hold the checkvalve 43 open. When electrical power to the valve 46 is dropped, the pilot line 44 exhausts to the tank 37.

A branch line 49 is connected to the cylinder line 41a at a point 50 just beyond the checkvalve 43, and the branch line 49 extends, in series, through a flow control valve 51, to an accumulator 52. The flow control valve 51 permits the accumulator 52 to discharge rapidly, yet effectively reduces fill flows coming from the system. The branch line 49 is connected, in parallel, to a pressure relief valve 53 immediately before the flow control valve 51, and the outlets 54,55 of the pressure relief valve 53 and the unpressurized cylinder port 56 are connected to the tank 37. The function of the pressure relief valve 53 is to limit system pressure if pilot pressure is lost to the checkvalve 43 during machine operation. All lines extending to the tank 37 may be tied together at convenient points.

In the event of an electrical failure or deliberate shutdown of power, the checkvalve 43 will quickly seat and block exhaust flow from the counterforce cylinder 25. The checkvalve 43 is very reliable and substantially minimizes leakage in comparison to other valves, for example, the directional valves 35,47 employed herein. The combination of the fast acting and reliable checkvalve 43, together with the accumulator 52, serves to maintain a pressure on the counterforce piston 26 which will substantially hold the slide position. In the system depicted, a secondary holding force contributed by the brake 21 complements the holding force exerted by the piston 26 and cylinder 25.

FIG. 1, the preferred embodiment, shows symbols for generally-ideal fluid devices which have precisely-defined flow paths and, in practice, most commonly-available commercial devices will suffice. However, for the invention to work properly, two critical elements, the pilot-operated checkvalve 43 and counterforce cylinder 25, must be of the so-called "zero-leak" varieties, i.e., containing relatively soft elastomeric sealing elements.

The pilot-operated checkvalve 43 chosen is the KEP-O-LOK poppet-style lock valve, Model No. 2711P6, having a flexible poppet seat, available from Kepner Products Company, Kep-O-Seal Valve Division, Villa Park, Ill. The counterforce cylinder chosen has soft continuous seal rings, Model No. 6CBB-2HLT14AC37, with LIPSEAL piston, available from Parker-Hannifin Company, Parker Cylinder Division, Des Plaines, Ill.

In an actual installation, involving the Cincinnati Milacron Inc. T-BAR CNC horizontal machining center, the fast-acting and long-holding system was able to maintain the tool within 0.0007 inch (0.018 mm) of its set position for three days. In the installation, the slide 11 weighed approximately 36,000 pounds (14173 kg); the 6 inch (153 mm) diameter piston had a rod diameter of 2.5 inches (63.5 mm), stroke length of 37 inches (939.7 mm) and was set at 36,000 pounds (14173 kg).

Sources and identifications for certain other system components are:

a) pressure reducing and relief valve 42; No. PPHB-LAN-HEL, Sun Hydraulics Corp., Sarasota, Fla.

b) flow control valve 51, No. F12005, Parker-Hannifin Company.

c) accumulator 52; No. 30A-2¼A, Greer Hydraulics, Chattsworth, Calif.

d) pressure relief valve 53; No. 2307-2000, Kepner Products Company.

Alternate Embodiment

Figure 2:
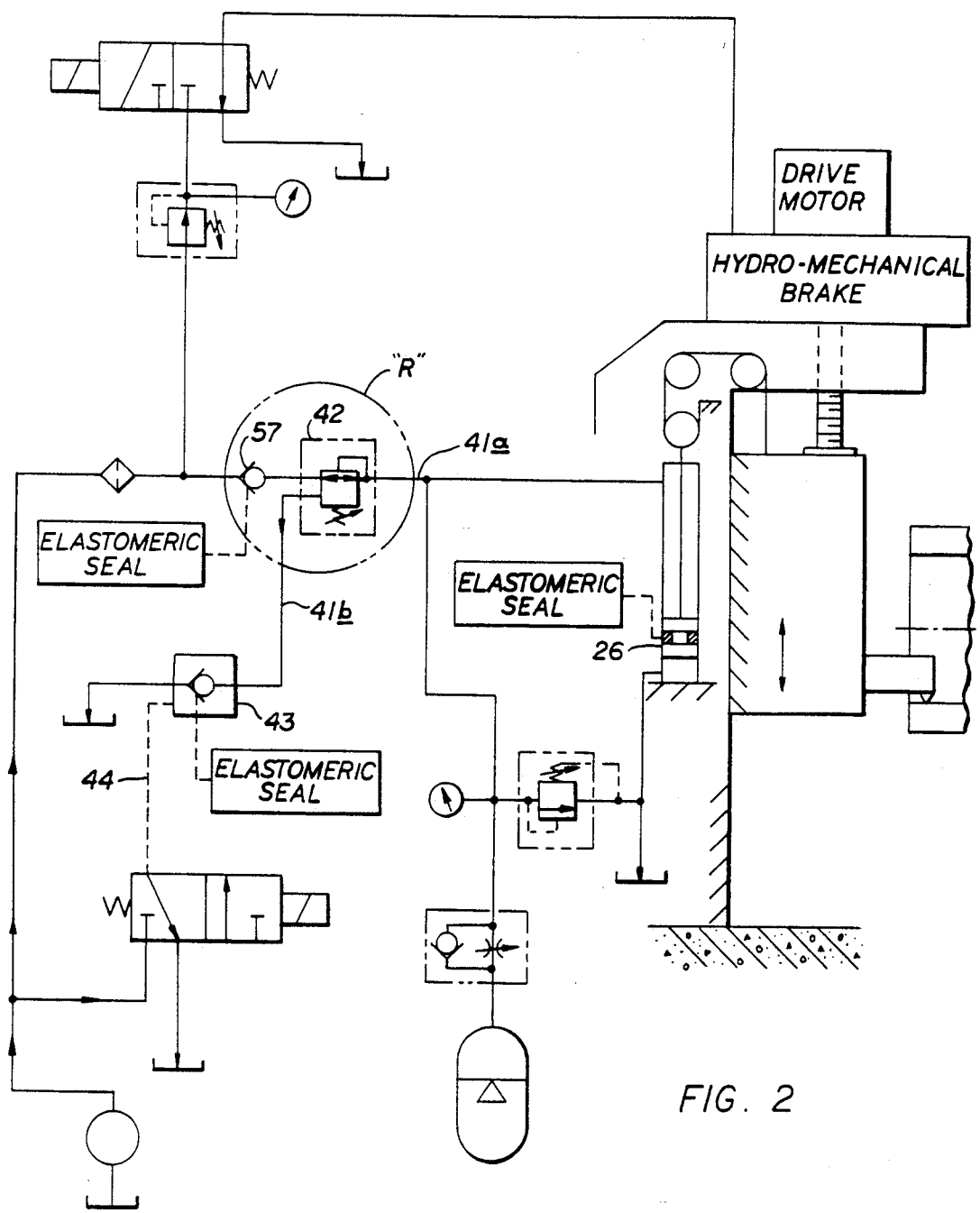
FIG. 2 is an alternate embodiment, showing a revised checkvalve arrangement in the hydraulic diagram.

In tests of the arrangement of FIG. 1, it has been observed that when the controlled outlet pressure of the pressure reducing and relief valve 42 (at cylinder line 41) approaches a 1:1 ratio with its inlet pressure (at main line 30), the preferred zero-leak Kepner checkvalve 43 will close off, and not permit the reverse flow, i.e., flow from the counterforce cylinder 25. This is because of logic inherent in the construction of the Kepner checkvalve 43. The alternate embodiment of FIG. 2 works well in this case, where the pilot-operated checkvalve 43 is moved into the exhaust line 41b and the reducing and relief valve means, "R" includes both the valve 42 and a "zero-leak" checkvalve 57 inserted between the main supply line 30 and the valve 42. A suitable checkvalve 57 is Kepner Products Co. Model No. 462 B1.

While the invention has been shown in connection with a preferred embodiment, it is not intended that the invention be so limited, but rather, the invention extends to all such designs and modifications as come within the scope of the appended claims.

What is claimed is:

1. In a machine tool having a machine base, a machine slide vertically-movable on the machine base, and power means for moving the machine slide, an improved counterforce and holding device for use in controlling the machine slide, wherein the improvement comprises:

counterforce cylinder means for exerting an upward force on the machine slide, the counterforce cylinder means including a cylinder, having a cooperating fluid powered piston guided therein, wherein the piston has an elastomeric seal ring, and wherein one of said cylinder and piston is attached to the machine slide and the other of said cylinder and piston is attached to the machine base;

reducing and relief valve means for controlling fluid pressure and flow between at least two of its following three ports:
(1) a pressure port,
(2) a cylinder port, and
(3) an exhaust port,
said pressure port connected by a pressure line to a source of pressurized fluid, said cylinder port connected by a cylinder line to said counterforce cylinder means, and said exhaust port connected by an exhaust line to a fluid reservoir;

pilot-operated checkvalve means for selectively blocking flow of fluid from said counterforce cylinder to said fluid reservoir via said cylinder line, the checkvalve means including an elastomeric seal, and the checkvalve means being selectively operable between a normally-closed first position blocking unidirectional flow of fluid therethrough, and a powered-open second position permitting bidirectional flow of fluid therethrough; and fluid accumulator means for storing pressurized fluid when said pilot-operated checkvalve means is in said second position, and for supplying pressurized fluid to said counterforce cylinder means when said pilot-operated checkvalve means is in said first position.

2. The device of claim 1, wherein said pilot-operated checkvalve means is located within said cylinder line.

3. In a machine tool having a machine base, a machine slide vertically-movable on the machine base, and power means for moving the machine slide, an improved counterforce and holding device for use in controlling the machine slide, wherein the improvement comprises:

counterforce cylinder means for exerting an upward force on the machine slide, the counterforce cylinder means including a cylinder, having a cooperating fluid powered piston guided therein, wherein the piston has an elastomeric seal ring, and wherein one of said cylinder and piston is attached to the machine slide and the other of said cylinder and piston is attached to the machine base;

reducing and relief valve means for controlling fluid pressure and flow between at least two of its following three ports:
(1) a pressure port,
(2) a cylinder port, and
(3) an exhaust port,
said pressure port connected by a pressure line to a source of pressurized fluid, said cylinder port connected by a cylinder line to said counterforce cylinder means, and said exhaust port connected by an exhaust line to a fluid reservoir;

pilot-operated checkvalve means for selectively blocking flow of fluid from said counterforce cylinder to said fluid reservoir via said cylinder line, the checkvalve means including an elastomeric seal, and the checkvalve means being selectively operable between a normally-closed first position blocking unidirectional flow of fluid therethrough, and a powered-open second position permitting bidirectional flow of fluid therethrough;

a checkvalve located within said pressure line, said checkvalve including an elastomeric seal, and wherein said pilot-operated checkvalve means is located within said exhaust line; and fluid accumulator means for storing pressurized fluid when said pilot-operated checkvalve means is in said second position, and for supplying pressurized fluid to said counterforce cylinder means when said pilot-operated checkvalve means is in said first position.

4. In a machine tool having a machine base, a machine slide vertically-movable on the machine base, and means for moving the machine slide, a method for counterforcing and holding the machine slide, comprising the following steps:

providing a counterforce cylinder means and including therein a cylinder, a cooperating piston, and an elastomeric piston seal ring;

attaching one of said cylinder and piston to the machine base and the other of said cylinder and piston to the machine slide;

providing valve means for directing flow of pressurized fluid into the cylinder through a cylinder line and exerting therewith an upward force on the machine slide;

permitting fluid flow out of the cylinder through the cylinder line when the machine slide is moved downward by independent power means;

providing a pilot-operated checkvalve means and including therein an elastomeric seal;

providing electrically-operated fluid valve means for operating the pilot-operated checkvalve means;

energizing the electrically-operated fluid valve means, thereby operating the pilot-operated checkvalve means to permit fluid flow to and from the cylinder through the cylinder line;

storing pressurized fluid in accumulator means while permitting fluid flow to and from the cylinder;

de-energizing the electrically-operated fluid valve means thereby operating the pilot-operated checkvalve means to block fluid flow from the cylinder through the cylinder line; and supplying pressurized fluid from the accumulator means to the cylinder while blocking fluid flow from the cylinder.

* * * * *